(12) United States Patent
Rethman et al.

(10) Patent No.: US 6,340,166 B1
(45) Date of Patent: Jan. 22, 2002

(54) KICKSTAND SUPPORT BASE FOR MOTORCYCLES

(76) Inventors: David A. Rethman; Debra Ann Rethman, both of 11528 Cherry Blossom Dr. West, Fishers, IN (US) 46038

( * ) Notice: Subject to any disclaimer, the term of this patent is extended or adjusted under 35 U.S.C. 154(b) by 0 days.

(21) Appl. No.: 09/571,856

(22) Filed: May 16, 2000

Related U.S. Application Data

(60) Provisional application No. 60/138,606, filed on Jun. 11, 1999.

(51) Int. Cl.$^7$ ................................................. B62H 1/02
(52) U.S. Cl. ...................... 280/293; 280/301; 248/188.9
(58) Field of Search ................................. 280/293, 295, 280/298, 301, 304, 763.1; 248/188.8, 188.9, 346.03, 346.01, 346.04

(56) References Cited

U.S. PATENT DOCUMENTS

| | | | | |
|---|---|---|---|---|
| 2,454,327 A | * | 11/1948 | Malsom | |
| 3,970,330 A | | 7/1976 | Norcross | |
| D241,528 S | | 9/1976 | Massa et al. | |
| 3,998,470 A | * | 12/1976 | Houston | 280/293 |
| 4,457,530 A | * | 7/1984 | Johnson | 280/293 |
| 4,474,387 A | | 10/1984 | Maranell et al. | |
| 4,521,031 A | | 6/1985 | Huth | |
| 4,768,800 A | | 9/1988 | Johns | |
| 4,846,491 A | | 7/1989 | Caceres | |
| 4,971,347 A | * | 11/1990 | Cline | 280/301 |
| 5,069,102 A | * | 12/1991 | Wolf | 84/280 |
| D348,861 S | | 7/1994 | Thomas | |
| 5,351,981 A | | 10/1994 | Thomas | |
| 5,484,153 A | | 1/1996 | Ricciardi | |
| D378,205 S | | 2/1997 | Hiltz, Jr. | |
| 5,623,855 A | * | 4/1997 | Miles | 74/564 |
| D396,435 S | | 7/1998 | Favereaux, Sr. | |
| 5,785,287 A | * | 7/1998 | Hoshino | 248/188.9 |
| 6,196,567 B1 | * | 3/2001 | Lynam et al. | 280/288.4 |

FOREIGN PATENT DOCUMENTS

| | | |
|---|---|---|
| JP | 1-240386 | 9/1989 |
| SE | 100814 | 2/1941 |

* cited by examiner

*Primary Examiner*—Avraham H. Lerner
(74) *Attorney, Agent, or Firm*—Richard C. Litman

(57) ABSTRACT

A kickstand accessory for supporting motorcycles which includes a substantially planar base having a retaining member for the foot portion of the kickstand, an upwardly angled arm and cooperating fastening members for attachment to the shank portion of the kickstand. The arm is attached at one end to the base and is formed at a predetermined angle in a upward direction with respect to the base. The retaining member is disposed on the upper surface of the base and consists of a substantially U-shaped wall for maintaining the foot portion of the kickstand in an abutting relationship. The retaining wall may also include a interior groove that releasably retains and secures the foot portion of the kickstand within the confines of the wall. The base has a relatively large surface area for particular use on soft, shifting or unstable terrains.

7 Claims, 4 Drawing Sheets

KICKSTAND SUPPORT BASE FOR MOTORCYCLES

CROSS-REFERENCE TO RELATED APPLICATION

This application claims the benefit of U.S. Provisional Patent Application Ser. No. 60/138,606, filed Jun. 11, 1999.

BACKGROUND OF THE INVENTION

1. Field of the Invention

The present invention relates generally to kickstand support bases. More specifically, the invention is a motorcycle kickstand support base which enables motorcycle riders to park their vehicles on a variety of soft terrain.

2. Description of Related Art

A number of kickstand accessories have been devised for supporting bicycles and motorcycles of different sorts. However, most of the conventional kickstand supports fail to provide sufficient structure for minimizing motorcycle related accidents. In particular, children have suffered minor to severe injuries playing around motorcycles which provide kickstand devices which are unstable in soft terrains. Children and adults alike have suffered broken limbs, burns from exhaust pipes, etc. from motorcycles which have fallen on top of them or a portion of their body. It has been observed that most of these types of injuries have been sustained in play areas, recreational parks, or emergency designated off-roads having soft or shifting terrain (i.e. asphalt, especially hot asphalt, gravel, sand, etc.). Mechanical damage has been a worry for the motorcycle owner, in particular, but the single most important concern has been potential injuries children which can be life threatening. While a number of the conventional devices purport to provide such preventive measures, none have been found to provide the structural features of a kickstand support which solve the above mentioned problems as herein described. For example, U.S. Pat. No. 3,970,330 issued to Norcross discloses a kickstand base for two-wheeled vehicles. A removable foot is adapted to friction fit on a ground-contacting shank of a conventional bicycle kickstand. The kickstand base has a substantially rectangular and low level pyramidal structure with a top surface from which a sleeve projects. The sleeve fits on the shank of a bicycle kickstand and is angled with respect to the foot sole to contact and support the kickstand with impending structural weight.

U.S. Pat. No. 4,474,387 issued to Maranelle et al. discloses a kickstand supporting device usable with motorcycles and other two wheeled vehicles. The support utilizes a rigid plate with obverse and reverse surfaces, an upright wall enclosure is positioned on the obverse face to receive and releasably retain the base of a vehicle kickstand. A combined centering and spacing fillet is centrally located on the obverse face and adjacent the wall for abutment with the base of the kickstand.

U.S. Pat. No. 4,521,031 issued to Huth discloses a kickstand support pad for two-wheeled vehicles. The pad is essentially a resting pad which allows a kickstand of a two wheeled vehicle to rest thereon. The standpad consists of a thin planar member having flat surfaces and an aperture selectively cut therethrough for attaching a carrying line or similar article during transport when the pad is not in use.

U.S. Pat. No. 4,768,800 issued to Johns discloses a bicycle stand device having an auxiliary pad for attachment to a foot or base portion of the bicycle stand. A clamp section has a pair of opposing semi-cylindrical clamp elements secured to the base via mechanical fasteners. A pair of clamps extend around the downwardly extending rod of a kickstand including the attachment of a pair of semi-shaped and semi-cylindrical elements therewith. A pair of brackets are also used for holding the pad section against the foot portion of the kickstand. This device comprises a number of fastened pieces which have occasion to loosen and require constant mechanical adjustments due to the effects of cyclical stress or constant use.

U.S. Pat. No. 4,846,491 issued to Caceres discloses a kickstand foot comprising an elongated generally U-shaped member pivotally secured to a clamp member and movable between an extended position projecting laterally with respect to the kickstand. The U-shaped member in combination with the clamp member secures the kickstand foot to the kickstand to distribute the weight of a bicycle to a surface. The U-shaped member retracts in a direction parallel to the kickstand to reduce wind resistance. This device presents a significant problem in that there is usually an insufficient surface area at the foot for uniformly distributing the weight of the motorcycle on soft surface. A similar device having a circular foot cross-section is disclosed in the U.S. Pat. No. 5,351,981 issued to Thomas. However, there are no pivoting features for the foot or base.

U.S. Pat. No. 5,484,153 issued to Ricciardi discloses a kickstand accessory for preventing marring of soft surfaces. The accessory comprises two mounting elements secured by nut and bolt fasteners to a housing. A plate is slidably secured to the housing via a chain link connection for covering a preselected area of the ground. The support base as herein described does not require a chain link connection or the use of multiple mechanical fasteners. The device is a single support base unit without the need for movable parts.

U.S. Design Patents issued to Massa et al. (U.S. Pat. No. 241,528), Favereaux, Sr. (U.S. Pat. No. 396,435), Hiltz, Jr (U.S. Pat. No. 378,205) and Thomas (U.S. Pat. No. 348,861) are illustrative of various kickstand support designs generally related to kickstand support base as herein described. The U.S. Design Patent by Thomas in particular features a circular kickstand base support designed to fit around the periphery of a kickstand and secured by a mechanical fastener. This particular design fails to address apparent slippage in the direction of impending weigh by a bicycle.

Foreign Patents issued to Roden (SE 100814) and Ishihara (JP 1240386) disclose the use of kickstand support mechanisms for bicycles and motorcycle, respectively having general relevance to the kickstand support base as herein described.

None of the above inventions and patents, taken either singly or in combination, is seen to describe the instant invention as claimed.

SUMMARY OF THE INVENTION

The invention is a kickstand support device for motorcycles comprising a substantially planar base which includes a retaining member for the foot portion of the kickstand, an upwardly angled arm and cooperating fastening means for attachment to the shank portion of the kickstand. The arm is attached at one end to the base and is formed at a predetermined angle in an upward direction with respect to the base. The retaining member is disposed on the upper surface of the base and preferably consists of a substantially U-shaped wall for maintaining the foot portion of the kickstand in an abutting relationship. The retaining wall may also include an interior groove that releasably retains and secures the foot portion of the kickstand within the confines of the wall. The fastening means is attached at an opposite end of the arm and preferably encircles the shank of the kickstand to provide for ready deployment and removal of the present device. The base of the present kickstand support device has a relatively large surface area for particular use on soft, shifting or unstable terrains. The base, arm and cooperating fastening members are preferably assembled to form the present device or may be formed as a single integrated kickstand support unit. The device of the present invention is made of a durable composite plastic and/or metal material.

Accordingly, it is a principal object of the invention to provide a kickstand support for motorcycles which prevents damage to and toppling of cycles on soft terrain.

It is a further object of the invention to provide a kickstand support which is durable and light-weight.

Still another object of the invention is to provide a kickstand support for motorcycles which is adapted for simple storage as a fixed kickstand support for a variety of motorcycles.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a kickstand support device for supporting motorcycles via the kickstand in soft terrains S, in particular. The preferred embodiments of the present invention are depicted in FIGS. 1–4, and are generally referenced by numeral 1.

Figure 1:
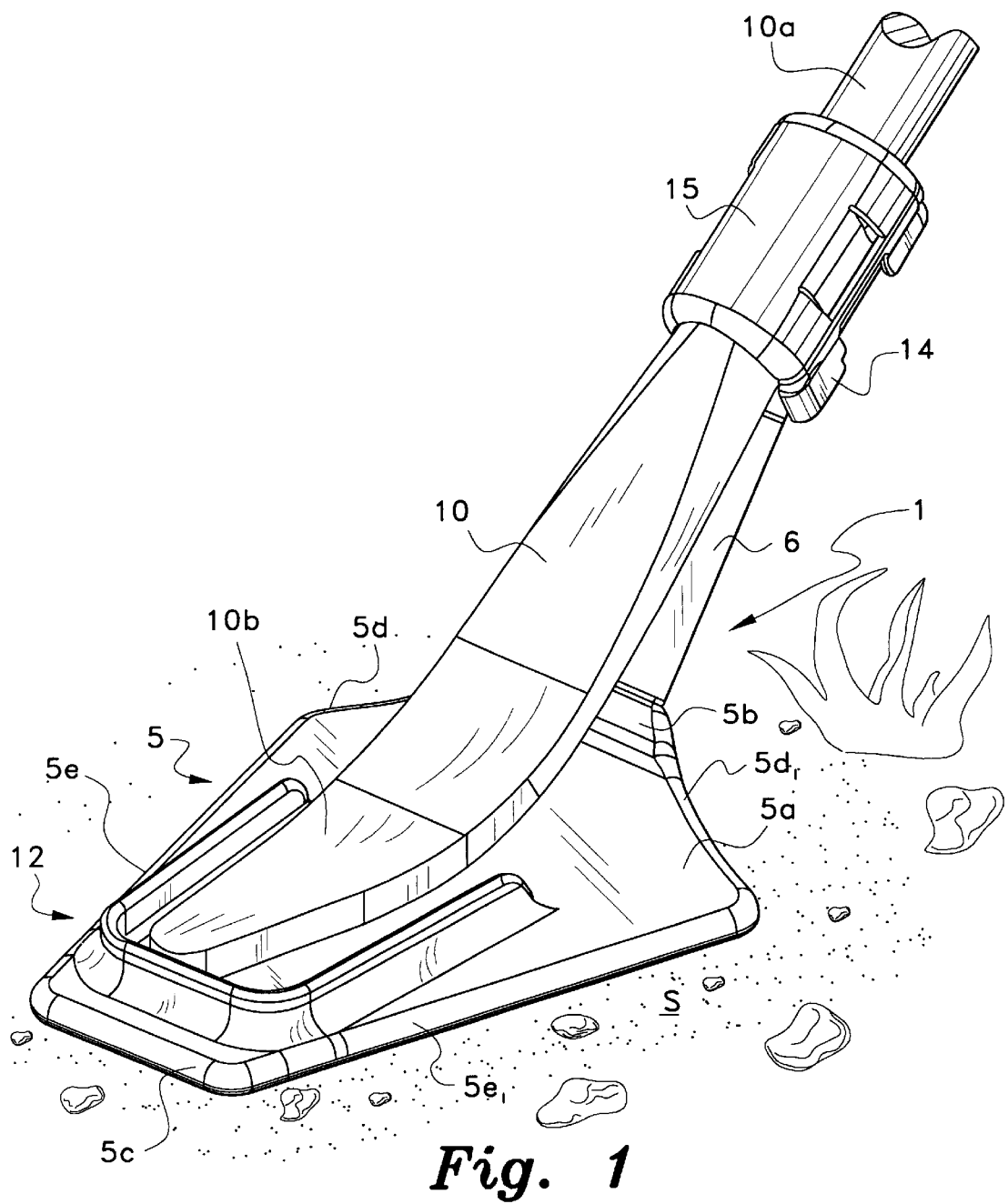
FIG. 1 is an environmental, perspective view of a support base for a motorcycle kickstand according to the present invention.
Figure 2:
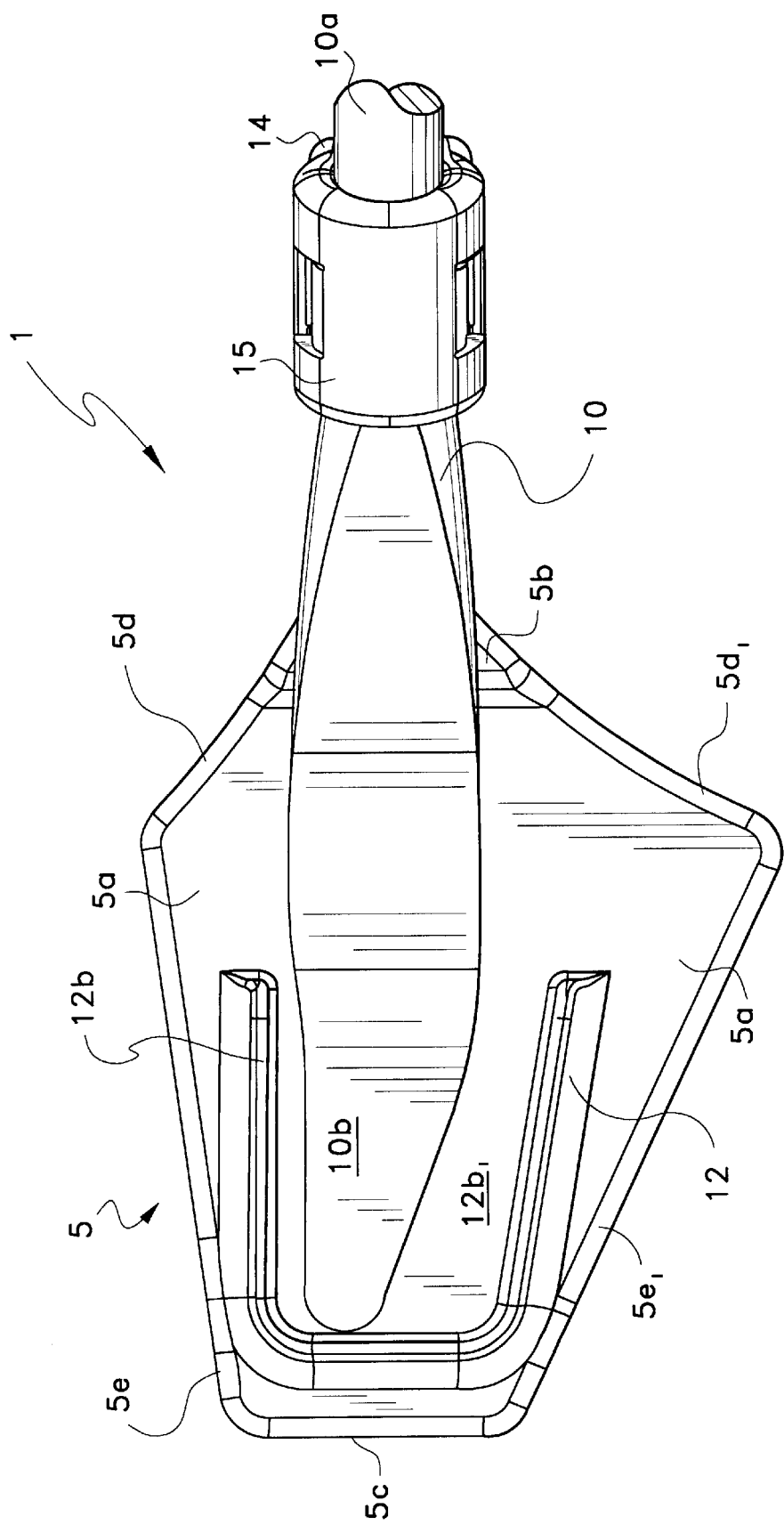
FIG. 2 is a top plan sectional view of FIG. 1 according to the invention.
Figure 3:
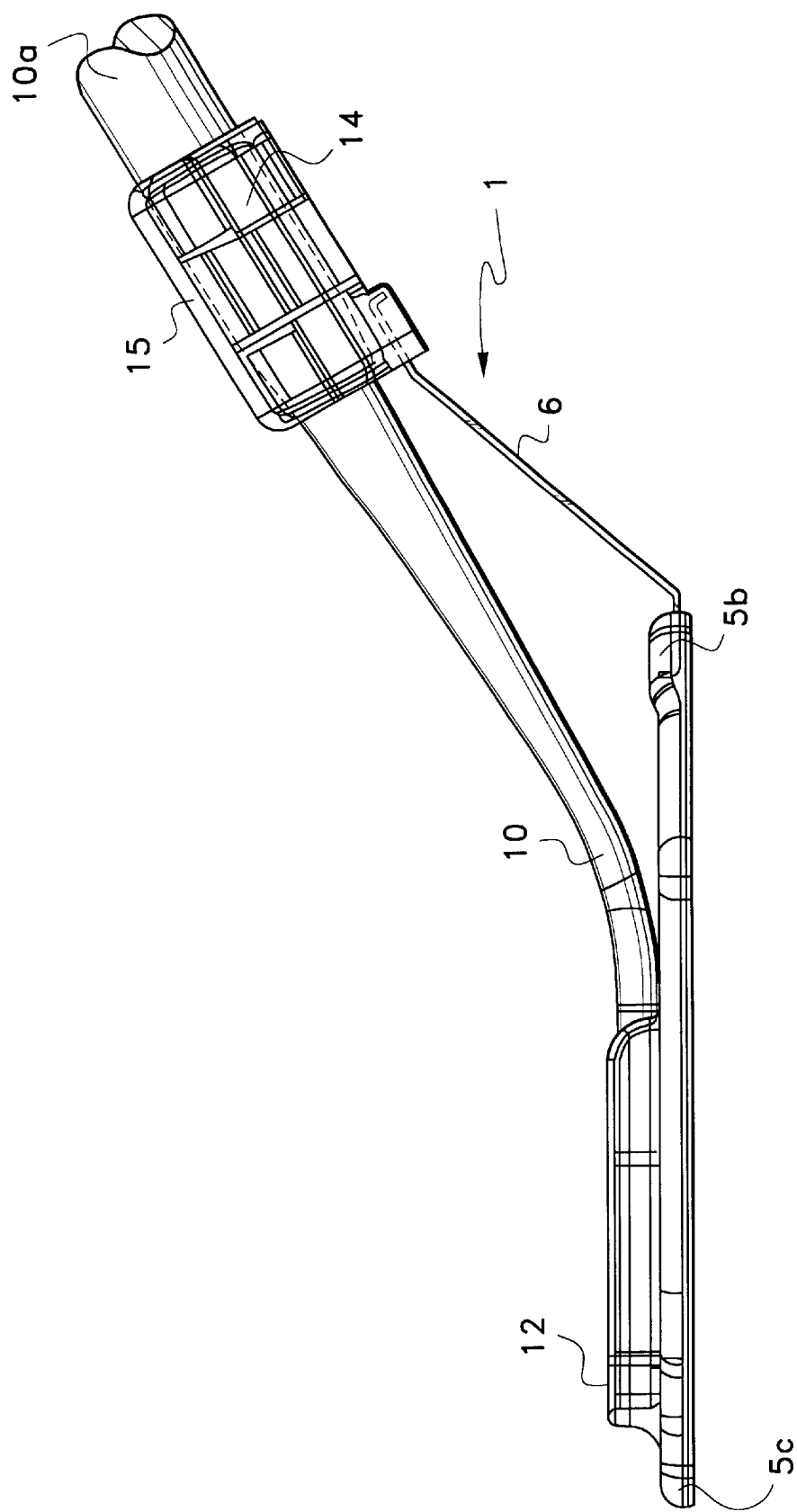
FIG. 3 is a perspective side view of the kickstand support base according to the invention, illustrating the mating interface between the kickstand and combination support base.

As best seen in FIG. 1, the kickstand support device 1 according to the preferred embodiment comprises a substantially planar base 5 having a large surface area relative to the foot portion 10b of the kickstand 10, an arm 6 angled upwardly from base 5 and cooperating fastening members 14,15 for attachment to the shank portion 10a of the kickstand 10. The base 5 includes a generally U-shaped wall 12 on the upper surface 5a for retaining the foot portion 10b of the kickstand 10 therewithin. Base 5 further includes a proximal end 5b and a distal end 5c, with sides $5d, 5d_1$ respectively extending outwardly from proximal end 5b, and elongated sides $5e, 5e_1$ respectively extending outwardly from distal end 5c to form an asymmetrical polygon. While base 5 can be variously configured, preferably the base 5 has an asymmetrical hexagonal configuration (best shown in FIG. 2) with a large surface area for providing the optimum stability in supporting a motorcycle under soft terrain conditions. Likewise, while the retaining wall 12 is depicted herein as being U-shaped, it can have a variety of shapes to accommodate a number of differently configured kickstand foots. As best shown in FIG. 2, retaining wall 12 may further include an interior recess or groove 12b (FIG. 2) dimensioned for receiving the foot portion 10b of the kickstand 10 in a slip-on manner to further secure it within the confines of wall 12. Retaining wall 12 and base 5 are preferably manufactured as a unitary plastic construction by injection molding.

The arm 6 is attached at one of its ends to the proximal end 5b of base 5 and extends in an upward direction at a predetermined angle. The opposite end of arm 6 is attached to one of the cooperating fastening members 14,15 that releasably snap together for ready securement to and removal of the present device 1 from the motorcycle kickstand 10. Preferably, each of fastening members 14,15 has an arcuate or semi-circular configuration for surrounding the generally circular shank portion 10a of the kickstand 10.

Figure 4:
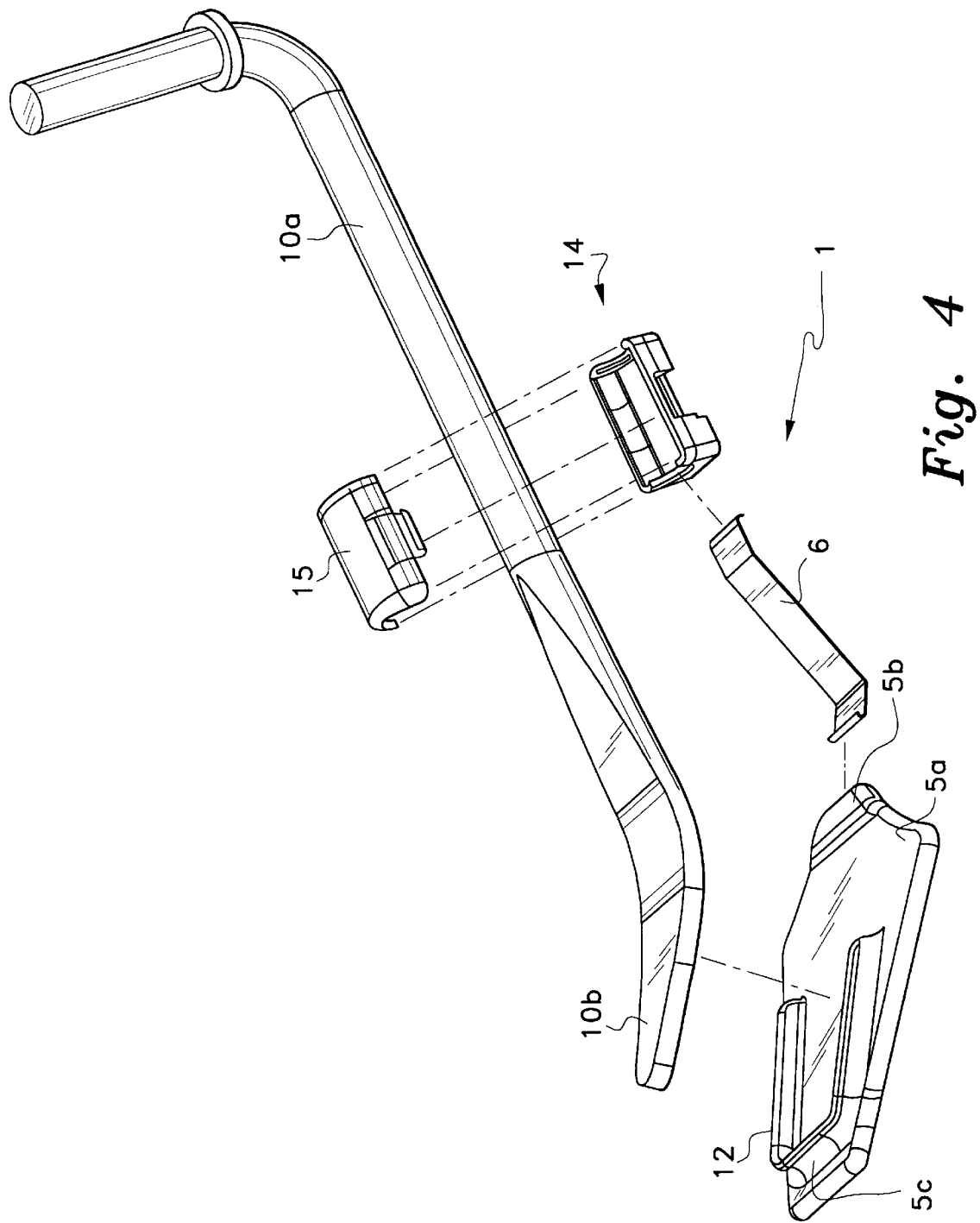
FIG. 4 is an exploded perspective view of the support base according to the invention, illustrating a mechanical clamp feature.

The base 5, arm 6 and mechanical fastening members 14,15 may be formed as a single integrated kickstand support unit, or manufactured as separate components as shown in the exploded view of FIG. 4, prior to assembly. The structural components of the kickstand support device 1 of the present invention are preferably made of any non-corrosive, weather-resistant, durable material such as stainless steel, a composite polymeric material, Kevlar or similar material. As described hereinabove, the base 5 is preferably constructed of a plastic material and must be of sufficient durability to withstand material deformation due to the weight of a motorcycle transmitted through the kickstand upon its upper surface 5a. Base 5 must also have the necessary rigidity to distribute the motorcycle's weight uniformly across its relatively large surface area.

It is to be understood that the present invention is not limited to the embodiments described above, but encompasses any and all embodiments within the scope of the following claims.

We claim:

1. A kickstand support device for a motorcycle comprising:
    a substantially planar base having an upper surface, a proximal end and a distal end, said base including a substantially U-shaped wall formed on the upper surface proximate the distal end for retaining a foot portion of a kickstand;
    an arm having a first end attached to the proximal end of said base and a second end, said arm extending upwardly at a predetermined angle with respect to the base; and
    cooperating fastening members for encircling a shank portion of the kickstand, one of said fastening members being attached to the second end of said arm.

2. The kickstand support device according to claim 1, wherein said wall includes an interior groove for releasably securing the foot portion of the kickstand within the confines of the wall.

3. The kickstand support device according to claim 1, wherein said base includes two opposing sides, each respectively extending outwardly from the proximal end, and two elongated sides, respectively extending outwardly from the distal end to form an asymmetrical polygon having a large surface area relative to that of the foot portion of the kickstand.

4. The kickstand support device according to claim 3, wherein said base has an asymmetrical hexagonal configuration of unitary construction.

5. The kickstand support device according to claim 3, wherein said base has an asymmetrical hexagonal configuration.

6. The kickstand support device according to claim 5, wherein said base is made of a durable plastic material.

7. The kickstand support device according to claim 1, wherein said cooperating fastening members include semi-circular elements that snap together.

* * * * *